(12) United States Patent
Ow et al.

(10) Patent No.: US 12,359,115 B2
(45) Date of Patent: Jul. 15, 2025

(54) METHOD OF TREATING A SUBSURFACE FORMATION WITH A COATED PROPPANT

(71) Applicant: Saudi Arabian Oil Company, Dhahran (SA)

(72) Inventors: Hooisweng Ow, Woburn, MA (US); Wei Wang, Quincy, MA (US); Sehoon Chang, Boston, MA (US); Shannon Eichmann, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/324,386

(22) Filed: May 26, 2023

(65) Prior Publication Data

US 2024/0392180 A1    Nov. 28, 2024

(51) Int. Cl.
*C09K 8/80* (2006.01)
*B82Y 30/00* (2011.01)
*E21B 47/11* (2012.01)

(52) U.S. Cl.
CPC .............. *C09K 8/805* (2013.01); *E21B 47/11* (2020.05); *B82Y 30/00* (2013.01); *C09K 2208/10* (2013.01)

(58) Field of Classification Search
CPC ...... C09K 8/805; C09K 2208/10; E21B 47/11
See application file for complete search history.

(56) References Cited

U.S. PATENT DOCUMENTS

| | | | |
|---|---|---|---|
| 9,297,244 B2 | 3/2016 | Mahoney et al. | |
| 2009/0087912 A1* | 4/2009 | Ramos | E21B 43/267 436/27 |
| 2010/0307745 A1* | 12/2010 | Lafitte | E21B 47/11 166/250.12 |
| 2013/0268198 A1* | 10/2013 | Nyhavn | G01V 9/00 702/6 |
| 2018/0171782 A1* | 6/2018 | Cox | E21B 47/11 |
| 2018/0194991 A9* | 7/2018 | Mahoney | C09K 8/80 |
| 2021/0198563 A1* | 7/2021 | Jenkins | B01J 2/006 |

(Continued)

FOREIGN PATENT DOCUMENTS

WO    2016118716 A1    7/2016

*Primary Examiner* — Crystal J Lee
(74) *Attorney, Agent, or Firm* — DINSMORE & SHOHL LLP

(57) ABSTRACT

A method of treating a subsurface formation with a coated proppant includes introducing the first hydraulic fracturing composition into a wellbore and the subsurface formation through a first zone of the plurality of zones of the subsurface formation; propagating at least one subsurface fracture in the first zone with the first hydraulic fracturing composition, and wherein the hydraulic fracturing composition includes a fluid medium and a first coated proppant dispersed within the fluid medium, the first coated proppant including: a particulate substrate; a first polymeric layer surrounding the particulate substrate, the first polymeric layer including a first chemical additive; and a second polymeric layer surrounding the first polymeric layer, the second polymeric layer including a first chemical tracer, the first chemical tracer including barcoded degradable polymers, fluorescent dyes, quantum dot nanoparticles, paramagnetic nanoparticles, up-conversion phosphors, long-persistent phosphors, or time-resolved fluorescence resonance energy transfer polymer-nanoparticles (TR-FRET).

17 Claims, 3 Drawing Sheets

(56) References Cited

U.S. PATENT DOCUMENTS

| | | |
|---|---|---|
| 2021/0230477 A1 | 7/2021 | Collins et al. |
| 2022/0145168 A1* | 5/2022 | Kersey .................... E21B 43/26 |
| 2024/0060417 A1* | 2/2024 | Wang ....................... C09K 8/80 |

* cited by examiner

METHOD OF TREATING A SUBSURFACE FORMATION WITH A COATED PROPPANT

TECHNICAL FIELD

Embodiments herein relates to compositions and methods of use for a coated proppant, and more specifically, to compositions and methods of use for a multi-layered coated proppant including chemical additives and chemical tracers.

BACKGROUND

In oil and gas drilling, wellbores may be drilled into the ground to extract hydrocarbons. Hydraulic fracturing is a stimulation treatment routinely performed on oil and gas wells to increase the rate of hydrocarbon production. Hydraulic fracturing fluids are pumped into the subsurface formation to be treated, causing fractures to open in the subsurface formation. This creates high permeability pathways through which hydrocarbons can be extracted and produced to surface. However, subsurface formations will 'heal' the fractures if the fractures are not held open when the hydraulic fracturing treatment is complete. For this purpose, proppants, such as grains of sand, may be mixed with the treatment fluid to keep the fracture open when the treatment is complete. Typical hydraulic fracturing treatments may consist of many individual 'stages' or 'zones' wherein distinct areas of the subsurface formation are isolated and hydraulically fractured systematically. Ideally, this results in a hydraulic fracturing treatment with many separate hydraulic fractures creating a network of hydraulic fractures that covers most of the subsurface formation.

SUMMARY

However, sometimes hydraulic fracturing treatments are ineffective, due to a variety of reasons. First, the treatments may have failed because the proppant in one or more of the stages was not adequately placed within the subsurface formation. This may result in the subsurface formation healing the fractures and losing stimulated area in the subsurface formation. Second, proppants may be adequately placed but may fail, i.e. be crushed, by subsurface formation stresses. This may also result in the subsurface formation healing the fractures.

Moreover, negative downhole events post hydraulic fracture treatment may also contribute to hydraulic fracture ineffectiveness. For example, hydraulically fractured zones may become plugged by subsurface formation fines or by paraffin precipitation from produced hydrocarbons. Hydraulically fractured zones may encounter water influx or migration, resulting in severe drops in hydrocarbon production and increases in undesirable formation water production. At surface, these problems might be observed as a drop in total production, but there is no way to determine what zones of the subsurface formation are encountering the problems, or where hydraulic fracturing stages were ineffective or failed.

Accordingly, a need exists for methods and compositions to identify or tag individual subsurface zones to determine hydraulic fracture treatment effectiveness by individual zone. A need also exists for methods and compositions to identify downhole events that may contribute to hydraulic fracture ineffectiveness. Ideally, the methods and compositions for identifying would not require surface intervention post hydraulic fracturing treatment. Also ideally, the methods and compositions would be able to proactively address negative downhole events also without surface intervention.

Embodiments herein addresses these needs by providing compositions and methods for using a multi-layered coated proppant including chemical tracers and chemical additives. The coated proppants may be placed within zones of a subsurface formation during hydraulic fracturing treatments and may release chemical tracers identifying where the coated proppants were placed after the hydraulic fracturing treatment is completed. The coated proppants also include chemical additives that may delay release when downhole events such as water influx later occur. The presence of the chemical tracers and chemical additives as part of a coated proppant may allow the identification and proactive treatment of many zones of the subsurface formation without surface intervention. Each of the chemical tracers used may be uniquely identifiable by chemical tracing techniques, as discussed herein.

Embodiments herein are generally directed to compositions for a coated proppant and methods for using the coated proppant that provide the aforementioned desired benefits.

In accordance with one embodiment herein, a coated proppant may include a particulate substrate, a first polymeric layer surrounding the particulate substrate, the first polymeric layer including chemical additives; and a second polymeric layer surrounding the first polymeric layer, the second polymeric layer including chemical tracers, and wherein the chemical tracers include barcoded degradable polymers, fluorescent dyes, quantum dot nanoparticles, paramagnetic nanoparticles, up-conversion phosphors, long-persistent phosphors, time-resolved fluorescence resonance energy transfer polymer-nanoparticles (TR-FRET), or combinations thereof.

In accordance with another embodiment herein, a hydraulic fracturing composition may include a fluid medium and a coated proppant.

In accordance with another embodiment herein, a method of treating a subsurface formation with a coated proppant may include introducing a first hydraulic fracturing composition into a wellbore, the wellbore fluidly connected to the subsurface formation by a plurality of zones spaced along the subsurface formation; introducing the first hydraulic fracturing composition into the subsurface formation through a first zone of the plurality of zones of the subsurface formation; and propagating at least one subsurface fracture in the first zone with the first hydraulic fracturing composition.

Additional features and advantages of the described embodiments will be set forth in the detailed description, which follows, and in part will be readily apparent to those skilled in the art from that description or recognized by practicing the described embodiments, including the detailed description, which follows, as well as the claims.

BRIEF DESCRIPTION OF THE DRAWINGS

The embodiments set forth in the drawings are illustrative and exemplary in nature and not intended to limit the subject matter defined by the claims. The following detailed description of specific embodiments herein may be best understood when read in conjunction with the following drawings, where like structure is indicated with like reference numerals and in which:

DETAILED DESCRIPTION

Figure 1:
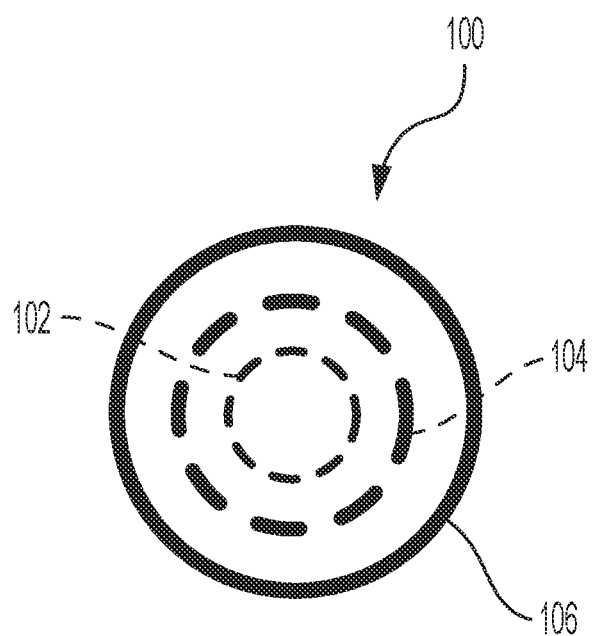
FIG. 1 illustrates a coated proppant, according to embodiments herein.

Embodiments herein are directed to compositions for a coated proppant, hydraulic fracturing compositions including the coated proppant, and methods of use for the coated proppant.

As used herein, "aqueous" refers to a fluid containing, producing, resembling, or having the properties of water.

As used herein, the term "chromatography" refers to a laboratory technique for the separation of a mixtures into its components. The mixture is typically dissolved in a fluid (gas or liquid) solvent typically called the "mobile phase," which carries the mixture through a system on which a material typically called the "stationary phase" is fixed. Because the different constituents of the mixture tend to have different affinities for the stationary phase and are retained for different lengths of time depending on their interactions with its surface sites, the constituents travel at different apparent velocities in the mobile fluid, causing them to separate. The separation is based on the differential partitioning between the mobile and the stationary phases. The separated mixture may then be analyzed with methods such as spectroscopy to establish the presence of a certain substance or measure the relative proportions of certain compounds in the mixture. "Gas chromatography" and "liquid chromatography" are subsets of chromatography and designate the mobile phase used in the process.

As used herein, the terms "downhole" and "uphole" may refer to a position within a wellbore relative to the surface, with uphole indicating direction or position closer to the surface and downhole referring to direction or position farther away from the surface.

As used herein, the term "hydraulic fracturing" refers to a stimulation treatment routinely performed on hydrocarbon wells in subsurface formations with a permeability of less than 10 milliDarcys. Hydraulic fracturing fluids are pumped into a subsurface formation, causing a fracture to form or open. Proppants are mixed with the treatment fluid to keep the fracture open when the treatment is complete. Hydraulic fracturing creates fluid communication within a subsurface formation and bypasses damage, such as condensate banking, that may exist in the near-wellbore area. As used herein, the term "wings" refers to the two cracks formed by a hydraulic fracture being 1800 apart and typically similar in shape and size.

As used herein, the term "hydraulic fracturing fluid" refers to a subset of wellbore fluids that is used to carry proppants into wellbores and subsurface formations.

As used herein, the term "oleaginous" refers to a fluid containing, producing, resembling, or having the properties of oil.

As used herein, the term "producing subsurface formation" refers to the subsurface formation from which hydrocarbons are produced.

As used herein, the term "proppants" refers to particles mixed with hydraulic fracturing fluids to hold fractures open after a hydraulic fracturing treatment. Proppant materials are carefully sorted for mesh size, roundness and sphericity to provide an efficient conduit for fluid production from the subsurface formation to the wellbore.

As used herein, the term "spectrometry," and more specifically "mass spectrometry," refers to an analytical technique typically used to measure the mass-to-charge ratio of ions. The results are presented as a "mass spectrum" or "spectra" a plot of intensity as a function of the mass-to-charge ratio. These spectra are typically used to determine the elemental or isotopic signature of a sample, the masses of particles and of molecules, and to elucidate the chemical identity or structure of molecules and other chemical compounds. In a typical mass spectroscopy procedure, a sample, which may be solid, liquid, or gaseous, is ionized, for example by bombarding it with a beam of electrons. This may cause some of the sample's molecules to break up into positively charged fragments or simply become positively charged without fragmenting. These ions (fragments) are then separated according to their mass-to-charge ratio, for example by accelerating them and subjecting them to an electric or magnetic field: ions of the same mass-to-charge ratio will undergo the same amount of deflection. The ions are detected by a mechanism capable of detecting charged particles, such as an electron multiplier. Results are displayed as spectra of the signal intensity of detected ions as a function of the mass-to-charge ratio. The atoms or molecules in the sample can be identified by correlating known masses (e.g. an entire molecule) to the identified masses or through a characteristic fragmentation pattern.

As used herein, the term "spectroscopy" refers to generally the study of the absorption and emission of light and other radiation by matter. "Fluorescence spectroscopy," as used herein, is a subset of the study of spectroscopy that utilizes beams of light to excite electrons in molecules of certain compounds, causing those molecules to emit light. The light emitted by the molecules is typically directed towards a filter and onto a detector for measurement and identification of the molecule. Certain molecules emit recognizable intensities when exposed to particular wavelengths of light, allowing them to be identified within a larger mixture of compounds. For example, the addition of these molecules to a fluid at a specified upstream point in a complicated flow regime may be used to recognize the origin point of certain fluids at a downstream location. As described herein, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As described herein, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used herein, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used herein, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

As previously stated, embodiments herein are directed to compositions for a coated proppant. Referring to FIG. 1, the coated proppant 100 may include a particulate substrate 102, a first polymeric layer 104 surrounding the particulate substrate 102, and a second polymeric layer 106 surrounding the first polymeric layer. The first polymeric layer may include chemical additives. The second polymeric layer may include chemical tracers. In embodiments, the second polymeric layer may further include chemical additives. The chemical additives in the second polymeric layer may be any of the chemical additives discussed infra, such as those mentioned for the first polymeric layer. Similarly, the first polymeric layer may further include chemical tracers. The chemical tracers may be any chemical tracers discussed infra, such as those mentioned for the second polymeric layer.

In some embodiments, the coated proppant may include at least one additional polymeric layer, such as a third polymeric layer, a fourth polymeric layer, a fifth polymeric layer, and so on. Each of the successive additional polymeric layers may surround the immediately previous polymeric layer, i.e., the third polymeric layer may surround the second polymeric layer, the fourth polymeric layer may surround the third polymeric layer, and so on. Each of the additional polymeric layers may include chemical additives, chemical tracers, or both. Accordingly, as discussed herein, the additional components stated herein that may be used in the first polymeric layer or the second polymeric layer may also be present in the additional polymeric layers.

The first and second polymeric layers may include additional components based on the chemical tracers or chemical additives included in the composition. For example, and in embodiments, the polymeric layers of the coated proppant may further include a polymer as part of the polymeric layers. The polymers may include oil-soluble polymers, water-soluble polymers, or combinations thereof. The oil-soluble polymers may include polyethylene, polypropylene, styrenes, polyisobutylene, or copolymers thereof. The water-soluble polymers may include carboxymethylcellulose, poly(ethylene glycol) (PEG), polyvinyls, polyacrylics, polyacrylamides, methacrylates, maleic anhydrides, polyaspartates, polyamines, polyimines, Polyoxazoline, Polyphosphates, Polyphosphazenes, Poly(vinyl acetamide), Poly(ethylene oxide), Poly(vinyl methyl ether), Poly(maleic acid), or copolymers thereof. The second, third, fourth, fifth and so on polymeric layers may include the same polymer or a different polymer than the first polymeric layer.

In embodiments, the styrenes may include styrene, p-methylstyrene, p-methoxystyrene, 2,4-dimethylstyrene, 4-chlorostyrene, 4 bromostyrene, or combinations thereof. The methacrylics may include phenyl methacrylate, hexyl methacrylate, butyl methacrylate, polymethyl methacrylate, or combinations thereof. The polyamines and polyimines may include polyethyleneamine and polyethyleneimine. The polyamines and polyimines may be linearly structured.

In embodiments, the coated proppant may include 5 wt. % polymer in the first polymeric layer, the second polymeric layer, or both as measured by the weight of the coated proppant. The coated proppant may include from 1 to 10 wt. %, from 1 to 6 wt. %, from 1 to 5 wt. %, from 1 to 4 wt. %, from 1 to 2 wt. %, from 2 to 10 wt. %, from 2 to 6 wt. %, from 2 to 5 wt. %, from 2 to 4 wt. %, from 4 to 10 wt. %, from 4 to 6 wt. %, from 4 to 5 wt. %, from 5 to 10 wt. %, from 5 to 6 wt. %, or from 6 to 10 wt. % polymer in the first polymeric layer, the second polymeric layer, or both, as measured by the weight of the coated proppant.

As mentioned earlier, the coated proppant may include a particulate substrate 102. In embodiments, the particulate substrate 102 may include sand. The sand may be a graded sand, a treated sand, a ceramic proppant, or a plastic proppant. Treated sands may include sands having surfaces modified by a polymerization initiator. The particulate substrate 102 may include particles generally resistant to deformation under pressure or at elevated temperature. The particulate substrate 102 may include particulate materials that do not melt at a temperature less than 300 degrees Celsius (300° C.), less than 250° C., less than 200° C., less than 150° C., or less than 100° C., for example. The particulate substrate 102 may include oxide particles, silicate particles, sands, ceramic particles, resin particles, plastic particles, mineral particles, glass particles, silica particles, alumina particles, titania, zirconia, boron, or combinations thereof.

In embodiments, the particulate substrate may further include a radical initiator. "Radical initiators," as used herein, are a category of compounds that may produce radical species under mild conditions and promote radical reactions. Radicals may be used to initiate polymerization by radical chain reactions. The radical initiator may include nitrogen-halogen bond molecules, azo compounds, and peroxides. The radical initiator may include ammonium persulfate, $((NH_4)_2S_2O_8)$. The particulate substrate may be exposed to the radical initiator. The particulate substrate being exposed to the radical initiator may result in free radicals on the surface of the particulate substrate, resulting in polymerization of the first polymeric layer to the particulate substrate.

As previously mentioned, the particulate substrate 102 is surrounded by the first polymeric layer 104. The first polymeric layer may include chemical additives. The chemical additives may include surface wettability altering agents, interfacial tension (IFT) reducing agents, fines control agents, or combinations thereof. The chemical additives included in the first polymeric layer may further include any chemical additives commonly used in oil and gas operations. For example, and in embodiments, the chemical additives may also include biocides, bactericides, corrosion inhibitors, scale inhibitors, hydrogen scavengers, hydrogen sulfide scavengers, foaming agents, de-foaming agents, gases, pH control additives, breakers, gas hydrate inhibitors, oxidizers, reducers, or combinations thereof. The polymeric layers may include from 1 to 20 wt. %, from 1 to 15 wt. %, from 1 to 10 wt. %, from 1 to 5 wt. %, from 5 to 20 wt. %, from 5 to 15 wt. %, from 5 to 10 wt. %, 10 to 20 wt. %, from 10 to 15 wt. %, or from 15 to 20 wt. % chemical additives by weight of the polymeric layer.

In embodiments, the first polymeric layer may further include the radical initiator. The first polymeric layer may be exposed to additional radical initiator after the first polymeric layer is polymerized to the particulate substrate. Without being limited by theory, the first polymeric layer being exposed to the additional radical initiator may result in free radicals on the surface of the first polymeric layer, resulting in polymerization of the second polymeric layer to the first polymeric layer.

The surface wettability agent, the interfacial tension reducing agent, or both may include surfactants, and the surfactants may be anionic, cationic, or neutral (zwitterionic or nonionic). Non-limiting examples of anionic surfactants include sulfonated polymers, sulfonated alkanes, polycarboxylated ethers, or combinations thereof. Non-limiting examples of cationic surfactants include trimethylalkylammonium salts, alkylbenxylammonium salts, or combinations thereof. Non-limiting examples of neutral surfactants include proteins, polyethylene glycol derivatives, oligosaccharides, cholesterol derivatives, or combinations of these. Without being limited by theory, the surfactant may interact with the subsurface formation in a variety of ways. In one non-limiting example, the surfactant, as the surface wettability agent, may change the wettability of the subsurface formation from oil-wet to water wet, thereby increasing the relative permeability of hydrocarbons in the subsurface formation and increasing hydrocarbon production.

In embodiments, the chemical additive may be the fines control agent. The fines control agent may be a clay stabilizer. The clay stabilizer may include chloride salts, hydroxide salts, quaternary ammonium, polyamines, or combinations thereof. Without being limited by theory, the fines control agents may interact with the subsurface formation in a variety of ways. In one non-limiting example, the fines control agents may interact with clays present in the subsurface formation, thereby inhibiting the clays from swelling when exposed to aqueous fluids. Without being limited by theory, the inhibiting of clay swelling may prevent the clays from plugging pore throats in the subsurface formation and thereby increase the rate of production from the same.

In embodiments, the first polymeric layer may further include a polymer encapsulating the chemical additives. The polymer may be a super absorbent polymer including sodium polyacrylate, polyacrylamide copolymer, ethylene maleic anhydride copolymer, cross-linked carboxymethylcellulose, polyvinyl alcohol copolymers, cross-linked polyethylene oxide, copolymers of polyacrylonitrile and polyaspartate, or combinations thereof. The super absorbent polymer may be formulated to shrink and expel the encapsulated chemical additives, or swell and release the encapsulated chemical additives, upon exposure to high-salinity water. Without being limited by theory, the rate of release of the encapsulated chemical additives may be dependent on the degree of crosslinking of the super absorbent polymer. The coated proppant may include 5 wt. % super absorbent polymer in the first polymeric layer, the second polymeric layer, or both as measured by the weight of the coated proppant. The coated proppant may include from 1 to 10 wt. %, from 1 to 6 wt. %, from 1 to 5 wt. %, from 1 to 4 wt. %, from 1 to 2 wt. %, from 2 to 10 wt. %, from 2 to 6 wt. %, from 2 to 5 wt. %, from 2 to 4 wt. %, from 4 to 10 wt. %, from 4 to 6 wt. %, from 4 to 5 wt. %, from 5 to 10 wt. %, from 5 to 6 wt. %, or from 6 to 10 wt. % super absorbent polymer in the first polymeric layer, the second polymeric layer, or both, as measured by the weight of the coated proppant.

As previously mentioned, the first polymeric layer 104 is surrounded by the second polymeric layer 106. The second polymeric layer may include chemical tracers. The chemical tracers may include barcoded degradable polymers, fluorescent dyes, quantum dot nanoparticles, superparamagnetic nanoparticles, up-conversion phosphor nanoparticles, long-persistent phosphor nanoparticles, time-resolved fluorescence resonance energy transfer polymer-nanoparticles (TR-FRET), or combinations thereof. As used herein, "barcoded degradable polymers" may also refer to "degradable polymers."

In embodiments, the coated proppant may include 1 wt. % chemical tracers by weight of the coated proppant, such as from 0.1 to 0.5 wt. %, from 0.5 wt. % to 1 wt. %, from 1 wt. % to 1.5 wt. %, from 1.5 wt. % to 2 wt. %, or combinations of these ranges or smaller ranges therein, such as from 0.1 wt. % to 2.0 wt. %. The polymeric layers may include 10 wt. % chemical tracer by weight of the polymeric layer, such as from 8 wt. % to 9 wt. %, from 9 wt. % to 10 wt. %, from 10 wt. % to 11 wt. %, from 11 wt. % to 12 wt. %, or combinations of these ranges or smaller ranges therein.

In embodiments, the barcoded degradable polymers may be made from monomers, including styrene, p-methylstyrene, p-methoxystyrene, 2,4-dimethylstyrene, 4-chlorostyrene, 4 bromostyrene, methacrylate, phenyl methacrylate, hexyl methacrylate, butyl methacrylate, methyl methacrylate, or combinations thereof. The barcoded degradable polymers may also include polylactic acid, polyhydroxyalkanoates, or both. Without being limited by theory, the barcoded degradable polymers may be thermally depolymerizable, whereby the barcoded molecular information from the original monomers can be extracted and identified by pyrolysis-gas chromatography-mass spectrometry (P-GC-MS) analysis. P-GC-MS is a method of chemical tracer analysis in which the sample is heated to decomposition to produce smaller molecules that are separated by gas chromatography and identified using mass spectrometry. The individual monomers, such as the styrenic and methacrylic monomers, may also be dispersed and incorporated into a polymeric layer or shell that may conformally coat, i.e. surround, the particulate substrate or another polymeric layer. The polymeric shell in this case may carry the barcoded information, and may be analyzed by P-GC-MS in a similar manner to the monomers. In embodiments, polymeric layers including the barcoded degradable polymers may be formed by the polymerization of monomers with radical initiators in a dilute solution or media with a stabilizer.

Without being limited by theory, coated proppants with polymeric layer or layers including barcoded degradable polymers may be stable when exposed to an aqueous phase but soluble in a hydrocarbon phase. For example, and in embodiments, the barcoded degradable polymer may dissolve or degrade when exposed to hydrocarbons or crude oil. When the polymeric shell including the barcoded degradable polymer dissolves, the substance the polymeric shell is surrounding may be at least partially exposed. Additionally, when the barcoded degradable polymer dissolves, the styrenic and methacrylic monomers may be released. The polymeric layers including the barcoded degradable polymer may further include a crosslinker and have varying degrees of crosslinking. It is contemplated that increasing concentrations of crosslinker, and thus increasing degrees of crosslinking, in the polymeric layer may slow the degradation of the barcoded degradable polymer. It is further contemplated that this slowing of degradation may be beneficial where a delayed release of the chemical tracers, particularly the styrenic and methacrylic monomers, is desired. It is further contemplated that barcoded degradable polymers that are not crosslinked may rapidly dissolve when exposed to hydrocarbons or crude oil. This may be beneficial where a rapid release of the chemical tracers is desired.

The coated proppant may include 5 wt. % barcoded degradable polymer by weight of the coated proppant. The coated proppant may include from 1 to 10 wt. %, from 1 to 6 wt. %, from 1 to 5 wt. %, from 1 to 4 wt. %, from 1 to 2 wt. %, from 2 to 10 wt. %, from 2 to 6 wt. %, from 2 to 5 wt. %, from 2 to 4 wt. %, from 4 to 10 wt. %, from 4 to 6 wt. %, from 4 to 5 wt. %, from 5 to 10 wt. %, from 5 to 6 wt. %, or from 6 to 10 wt. % barcoded degradable polymer by weight of the coated proppant.

As mentioned earlier, the chemical tracers may include fluorescent dyes. The fluorescent dyes may include fluorescein, Rhodamine, Nile red, Nile blue, lumogen, and their additives. The fluorescent dye may also include dye molecules with a reactive group which can covalently bond to the polymeric layer. The reactive dyes may be fluorescent isothiocyanates or fluorescent succinimidyl esters, including fluorescein isothiocyanates (FITC), Rhodamine B isothiocynates (RBITC), fluorophore esters, fluorescein succinimidyl esters, Rhodamine B succinimidyl esters, or combinations thereof.

In embodiments, polymeric layers including fluorescent dyes may be formed using polyamines or polyimines as the polymer. The polyimine may be polyethyleneimine (PEI). The polyamines or polyimines may encapsulate the fluorescent dyes in the polymeric layer or layers. For example, and in embodiments, PEI may be immobilized as a polymeric shell over the particulate substrate or first polymeric layer with the assistance of a copolymer such as ethylene glycol dimethacrylate (EGDA). In these embodiments, the primary and secondary amine groups in the PEI may form covalent conjugation sites that allow the reactive fluorescent dyes to graft onto the PEI, forming a fluorescent PEI polymer. The fluorescent dyes may graft to the PEI through amine-isothiocyanate or amine-succinimidyl ester reactions, for example as shown below in Equations 2 and 3, where $R_I$ and $R_{II}$ can be H, alkyl or aryl groups.

EQUATION 2

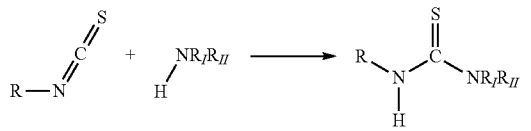

EQUATION 3

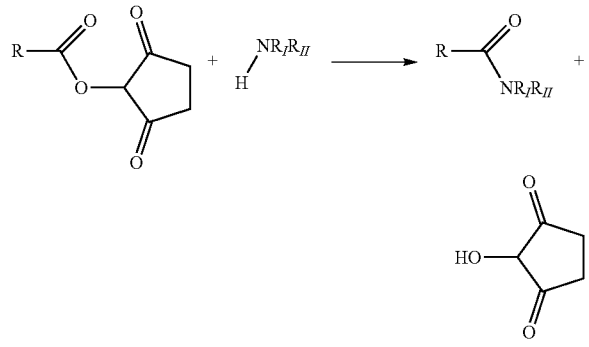

As mentioned earlier, and the polymer included in the polymeric layer may depend on the compatibility with other components, like the chemical tracer, present in the layer. For example, and in embodiments, layers including fluorescent dyes may only be compatible with polymers with isothiocyanate or succinimidyl reaction sites as the fluorescent dyes may need such reaction sites to be immobilized in the polymeric layer.

In embodiments, polymeric layers including fluorescent isocyanates and PEI may be stable in aqueous solutions, but soluble in hydrocarbons. In embodiments, polymeric layers including fluorescent succinimidyl esters and PEI may be stable in hydrocarbons, but soluble in aqueous solutions. Accordingly, contact of the polymeric layer with the appropriate fluid may trigger the fluorescent dyes' release from the polymeric layer. Similarly, contact with the appropriate fluid may also trigger the release of the fluorescent PEI polymer from the polymeric layer. The fluorescent dyes, the fluorescent PEI polymer, or both may then be analyzed by chemical tracing techniques such as fluorescence spectroscopy. It is contemplated that the fluorescent succinimidyl ether being soluble in aqueous solutions may make it desirable for use in non-aqueous hydraulic fracturing compositions. Further, it is contemplated that the fluorescent succinimidyl ether being soluble in aqueous solutions may make it desirable for use as a chemical tracer in detecting water influx in subsurface formations.

As mentioned earlier, the chemical tracers may include quantum dot nanoparticles. The quantum dot nanoparticles may include chalcogenide quantum dots. Polymeric layers including quantum dot nanoparticles may be formed using polyacrylic acid as the polymer. A hydrogel may be formed with the addition of a copolymer such as EGDA. The polyacrylic acid may be coated over the particulate substrate or the first polymeric layer as a hydrogel coating. The chalcogenide quantum dots may be formed by mixing transition metal ions and chalcogens into the polyacrylic acid. The transition metal ions may then bind with the carboxylate groups of the polyacrylic acid. The chalcogens then bind with the transition metals to form the chalcogenide quantum dots. The chalcogenide quantum dots are immobilized in the polyacrylic acid, which in turn may be immobilized in the hydrogel coating. As mentioned earlier, the polymer included in the polymeric layer may depend on the compatibility with other components, like the chemical tracer, present in the layer. For example, and in embodiments, layers including quantum dot nanoparticles may only be compatible with polymers containing carboxylate groups because the transition metals may need to bind with the carboxylate groups to be immobilized in the polymeric layer.

In embodiments, polymeric layers including the quantum dot nanoparticles and the polyacrylic acid as the hydrogel may be stable in aqueous fluids and soluble in hydrocarbons. Accordingly, contact of the polymeric layer with hydrocarbons may trigger the quantum dot nanoparticles' release from the polymeric layer. The quantum dot nanoparticles may then be analyzed by chemical tracing techniques such as fluorescence spectroscopy. The transition metals may include zinc, manganese, copper, nickel, cadmium, mercury, lead, salts thereof, or any combinations thereof. The chalcogens may include, sulfur, selenium, tellurium, salts thereof, or any combinations thereof.

As mentioned earlier, the chemical tracers may include superparamagnetic nanoparticles. The superparamagnetic nanoparticles may include $Fe_3O_4$, $CoFe_2O_4$, $NiFe_2O_4$, $MnFe_2O_4$, or combinations thereof. In embodiments, polymeric layers including the superparamagnetic nanoparticles may be formed using polyamines or polyimines as the polymer. The polyimine may be polyethyleneimine. The polyimines or polyamines may encapsulate the superparamagnetic nanoparticles in the polymeric layer or layers. For example, and in embodiments, PEI may be immobilized as a polymeric shell over the particulate substrate or first polymeric layer with the assistance of a copolymer such as EGDA. Without being limited by theory, the primary and secondary amine groups in the PEI may then form covalent conjugation sites that allow the superparamagnetic nanoparticles to graft onto the PEI, forming a superparamagnetic PEI polymer.

In embodiments, polymeric layers including the dispersed superparamagnetic nanoparticles and PEI may be stable in aqueous solutions, but dissolvable in hydrocarbons, or vice versa, depending on the capping layer composition chosen, as explained in further detail herein. Accordingly, contact of the polymeric layer with the appropriate fluid may trigger the superparamagnetic nanoparticles' release from the dissolved capping layer. Similarly, contact with the appropriate fluid may also trigger the release of the PEI polymer from the polymeric layer. The associated dispersed superparamagnetic nanoparticles, the PEI polymer, or both may then be analyzed by chemical tracing techniques such as Inductively Coupled Plasma Analysis (ICP) or ICP-mass spectrometry for the superparamagnetic nanoparticles, or P-GC-MS for the PEI polymers. As mentioned earlier, and the polymer included in the polymeric layer may depend on the compatibility with other components, like the chemical tracer, present in the layer. For example, and in embodiments, layers including superparamagnetic nanoparticle may only be compatible with polyamines and polyimines because the superparamagnetic nanoparticles may need to bind to an amino group to be immobilized in the polymeric layer.

It is contemplated that the superparamagnetic nanoparticles' attraction to magnetic fields may be utilized in chemical tracing applications by magnetically filtering subsurface formation fluids that are produced from the well. Presence of superparamagnetic particles ($Fe_3O_4$, $CoFe_2O_4$, $NiFe_2O_4$, $MnFe_2O_4$, or combinations thereof) indicates that subsurface formation fluids are being produced from the zones of the subsurface formation that the superparamagnetic particles were injected into. Additionally, by determining the concentration of the additional metallic element in the ferrite (for example Fe, Co, Ni, or Mn) multiple superparamagnetic chemical tracers can be compared to determine how much subsurface formation fluid is being produced from each zone of the subsurface formation. In embodiments, the additional metallic element in the ferrite may be determined by dissociating the metallic element from the ferrite, such as by dissolving in an acid, which may be nitric acid. The dissociated additional metallic element may then identified and quantified by inductively coupled plasma optical emission spectroscopy (ICP-OES) or inductively coupled plasma mass spectrometry (ICP-MS). Without being limited by any particular theory, detection of the additional metallic elements in solution may be at a ppb (parts-per-billion) or sub-ppb level.

As previously discussed, the chemical tracers may include up-conversion phosphor nanoparticles. Up-conversion phosphors are known to be able to 'up-convert' two or more lower-energy photons into one high-energy photon. These properties may be used to clearly identify the up-conversion phosphors by the up-converted photons. The up-conversion phosphor nanoparticles may include a base inorganic compound and dopant ions. The base compounds may include $NaYF_4$, $YPO_4$, $Y_2O_3$, $TiO_2$, $ZrO_2$, or combinations thereof. The dopant ions may include ions of Tb, Ho, Er, Tm, Yb, or co-dopants thereof. The up-conversion phosphor nanoparticles may include $NaYF_4$ co-doped by $Er^{3+}Yb^{3+}$, $Tm^{3+}Yb^{3+}$, or $Ho^{3+}Tb^{3+}$; YPO4 co-doped by $Tm^{3+}Yb^{3+}$ or $Tb^{3+}Yb^{3+}$; $Y_2O_3$ co-doped by $Er^{3+}Yb^{3+}$ or $Tb^{3+}Yb^{3+}$; $TiO_2$ co-doped by $Er^{3+}Yb^{3+}$ or $Tm^{3+}Yb^{3+}$; $ZrO_2$ co-doped by $Er^{3+}Yb^{3+}$ or $Tm^{3+}Yb^{3+}+$; or combinations thereof.

In embodiments, polymeric layers including the up-conversion phosphor nanoparticles may include polyacrylics, polyacrylamides, polyvinyls, or combinations thereof as the polymer. This may include polyacrylic acid, polyacrylamide, polymethyl methacrylate, polyvinyl alcohol, or combinations thereof. In embodiments, a hydrogel may be formed from the polyacrylic acid, the polyacrylamide, polymethyl methacrylate, polyvinyl alcohol, or combinations thererof with the addition of a copolymer such as EGDA. The hydrogel may be coated over the particulate substrate or the first polymeric layer as a hydrogel coating. The up-conversion phosphor nanoparticles may then be suspended within the hydrogel coating. While hydrogels have been specifically mentioned as the polymer for polymeric layers including up-conversion phosphor nanoparticles, it is contemplated that any of the polymers previously mentioned herein may be suitable as the polymer to suspend the up-conversion phosphor nanoparticles.

In embodiments, polymeric layers including the up-conversion phosphor nanoparticles and the hydrogel may be stable in aqueous fluids but dissolvable in hydrocarbons. Accordingly, contact of the polymeric layer with hydrocarbons may trigger the up-conversion phosphor nanoparticles' release from the polymeric layer. The up-conversion phosphor nanoparticles may then be analyzed by chemical tracing techniques such as fluorescence imaging or fluorescence spectroscopy.

As mentioned earlier, the chemical tracers may include long-persistent phosphor nanoparticles. Long-persistent phosphor nanoparticles are also commonly referred to as 'glow-in-the-dark phosphors.' Without being limited by theory, long-persistent phosphors store excitation energy in excited states, with the resulting luminescence lasing for an appreciable time after the excitation has stopped. The long-persistent phosphor nanoparticles may include phosphorescent materials and dopant ions. The phosphorescent materials may include $SrAl_2O_4$, $CaTiO_3$, $CaAl_2Si_2O_8$, $ZnGa_2O_4$, $LiGa_5O_8$, $Al_2Ga_3O_{10}$, $SrGai_2O_{19}$, $Sr_2P_2O_7$, or combinations thereof. The dopant ions may include ions of Cr, Pr, Eu, Dy, Lu, or co-dopants thereof. The long-persistent phosphor nanoparticles may include $SrAl_2O_4:Eu^{2+}$, $SrAl_2O_4:Dy^{3+}$, $CaTiO_3:Pr^{3+}$, $CaAl_2Si_2O_8:Eu^{2+}$, $CaAl_2Si_2O_8:Dy^{3+}$, $ZnGa_2O_4:Cr^{3+}$, $LiGa_5O_8:Cr^{3+}$, $Al_2Ga_3O10:Cr^{3+}$, $SrGa_{12}O_{19}:Cr^{3+}$, $Sr_2P_2O_7:Lu^{3+}$, or combinations thereof.

In embodiments, polymeric layers including the long-persistent phosphor nanoparticles may be formed using polyamines or polyimines as the polymer. The polyimine may be polyethyleneimine. The polyimines or polyamines may encapsulate the long-persistent phosphor nanoparticles in the polymeric layer or layers. For example, and in embodiments, PEI may be immobilized as a polymeric shell over the particulate substrate or first polymeric layer with the assistance of a copolymer such as ethylene glycol dimethacrylate. In these embodiments, the long-persistent phosphor nanoparticles may be dispersed in the polyethyleneimine. While PEI has been specifically mentioned as the polymer for polymeric layers including long-persistent phosphor nanoparticles, it is contemplated that any of the polymers previously mentioned herein may be suitable as the polymer to disperse the long-persistent phosphor nanoparticles.

In embodiments, polymeric layers including the dispersed long-persistent phosphor nanoparticles and PEI may be stable in aqueous solutions, but dissolvable in hydrocarbons. Accordingly, contact of the polymeric layer with the appropriate fluid may trigger the long-persistent phosphor nanoparticles' release from the polymeric layer. The long-persistent phosphor nanoparticles may then be analyzed by chemical tracing techniques such as fluorescence spectroscopy or time-delayed fluorescence spectroscopy.

As mentioned earlier, the chemical tracers may include TR-FRET polymer nanoparticles. The TR-FRET polymer nanoparticles may include energy donor materials and acceptor materials. The energy donor materials may be lanthanide-molecular ligands. The lanthanide molecular ligands may include phenanthroline with Tb, phenanthroline with Eu, bipydridine-based ligands, or combinations thereof. The acceptor materials may be dye molecules. The dye molecules may include Rhodamine B, Nile Red, or both.

In embodiments, polymeric layers including the TR-FRET polymer nanoparticles may include polyacrylics, polyacrylamides, polyvinyls, or combinations thereof as the polymer. This may include polyacrylic acid, polyacrylamide, polymethyl methacrylate, polyvinyl alcohol, or combinations thereof. In embodiments, a hydrogel may be formed from the polyacrylic acid, the polyacrylamide, polymethyl methacrylate, polyvinyl alcohol, or combinations thererof with the addition of a copolymer such as EGDA. The hydrogel may be coated over the particulate substrate or the first polymeric layer as a hydrogel coating. The TR-FRET polymer nanoparticles may then be suspended within the hydrogel coating. While hydrogels have been specifically mentioned as the polymer for polymeric layers including TR-FRET polymer nanoparticles, it is contemplated that any of the polymers previously mentioned herein may be suitable as the polymer to suspend the TR-FRET polymer nanoparticles.

In embodiments, polymeric layers including the TR-FRET polymer nanoparticles and the hydrogel may be stable in aqueous fluids and dissolvable in hydrocarbons. Accordingly, contact of the polymeric layer with hydrocarbons may trigger the TR-FRET polymer nanoparticles' release from the polymeric layer. The TR-FRET polymer nanoparticles may then be analyzed by chemical tracing techniques such as time-resolved fluorescence spectroscopy.

In embodiments, the polymeric layers of the coated proppant may further include a crosslinker. The first polymeric layer may include the same crosslinker as the second polymeric layer. The first polymeric layer may include a different crosslinker than the second polymeric layer. Further, one polymeric layer may include a crosslinker while the other polymeric layer does not. The crosslinkers may include maleic rosin glycol acrylate, ethylene dimethacrylate, ethylene glycol dimethacrylate, divinylbenzene, or combinations thereof.

The polymeric layers may include 5 wt. % crosslinker. In embodiments, polymeric layers with a higher weight percentage of crosslinker, between 4.5 wt. % to 5 wt. % crosslinker, may result in a delayed release of the chemical tracers, the chemical additives, or both. It is contemplated that the release of the chemical tracers, the chemical additives, or both may be delayed by from 6 to 12 months after initial contact with the subsurface formation fluids.

While the effects of the crosslinker on polymeric layers including the degradable polymer have been discussed, the presence of the crosslinker may have a similar impact on other polymers in the polymeric layers. That is, the presence of the crosslinker in combination with the various polymers discussed herein may slow the degradation or dissolving of the various polymers discussed herein. Further, the presence of the crosslinker in combination with the various polymers discussed herein may delay or slow the release of chemical additives, chemical tracers, or both from the polymeric layers.

Delayed release of the chemical additives, chemical tracers, or both may be desirable in a variety of situations. For example, delayed release of foamers may be beneficial where gas-lift or enhanced oil recovery techniques like flooding are contemplated for later stages of production from the subsurface formation. Similarly, other chemical additives disclosed herein may be desired to release later. Scale inhibitors could be later released when subsurface formation pressures decrease, resulting in paraffin scaling of the wellbore and wellbore bottomhole assemblies. The scale inhibitors could then address the scaling problems proactively without requiring surface intervention. Delayed release of chemical tracers may be desired where future water influx into the subsurface formation is a concern. Water influx, as described herein, refers to a general set of subsurface conditions where subsurface formation water sources can predominate hydrocarbon sources as produced fluids in later stages of hydrocarbon production. Such water influx is generally referred to as either water coning of a well (vertical wells) or water cresting of a well (horizontal wells). It is contemplated that water-soluble polymeric layers that are heavily crosslinked may not dissolve or release their chemical tracers, chemical additives, or both until a significant percentage of the fluids produced from the zone containing those coated proppants is water, signaling water influx. The presence of these chemical tracers at the surface may then not only indicate water influx is present, but where the water influx is coming from in the subsurface formation.

Slowed release of the chemical additives, chemical tracers, or both may also be desirable in a variety of situations. For example, at least some of the chemical additives discussed herein may be traditionally used in other treatment methods, i.e. scale inhibitors may be continuously needed to prevent scale formation in the wellbore over an extended period of time.

In embodiments, it is contemplated that the second polymeric layer may be formulated to be stable in an aqueous fluid that carries the coated proppant into the subsurface formation, while being soluble by oil in the subsurface formation. In one embodiment, this may be accomplished by including a hydrogel. Further, the first polymeric layer may be highly crosslinked and formulated to be stable in subsurface formation fluids like oil but soluble upon sustained contact with water in the subsurface formation. In one non-limiting example, this may be accomplished by including a polyethyleneimine with amine-succinimidyl ester reaction sites. In this manner, the coated proppant could be stable in the carrier fluid, release the first polymeric layer's substances in the subsurface formation, and then later release chemical tracers, chemical additives, or both in the subsurface formation when water influx occurs.

In embodiments, the coated proppant 100 may further include a capping layer, which also may be referred to herein as a sacrificial layer. The capping layer may surround the second polymeric layer 106, similar to or identical to the at least one additional polymeric layer. The capping layer may surround the second polymeric layer such that the second polymeric layer 106 cannot interact with subsurface formation fluids. The capping layer may be operable to dissolve, degrade, or otherwise interact with subsurface formation fluids such that the capping layer will cease to surround the second polymeric layer 106. Thereby the second polymeric layer will contact or otherwise interact with the subsurface formation fluids. The coated proppant 100 may also include an intermediate layer, which may also be referred to an intermediate sacrificial layer. The intermediate layer may be positioned between the second polymeric layer 106 and the first polymeric layer 104 such that the intermediate layer surrounds the first polymeric layer 104 and the second polymeric layer 106 surrounds the intermediate layer. The intermediate layer may have similar properties and purpose to the capping layer, but with respect to the first polymeric layer instead of the second polymeric layer.

The capping layer, the intermediate layer, or both may include any of the polymers previously discussed. For example, the capping layer, the intermediate layer, or both may include the oil soluble polymer, such as styrene, as the polymer. Thereby, the capping layer, the intermediate layer, or both may degrade upon contact with hydrocarbons in the subsurface formation, exposing the polymeric layer or layers beneath. In another example, the capping layer, the intermediate layer, or both may include the water soluble polymer, such as the super absorbent polymer, as the polymer. Thereby, the capping layer, the intermediate layer, or both may dissolve upon contact with hydrocarbons in the subsurface formation, exposing the polymeric layer or layers beneath.

In embodiments, the coated proppants discussed herein may be included in a hydraulic fracturing fluid as a hydraulic fracturing composition. As previously mentioned, hydraulic fracturing fluids may be used to carry proppants into wellbores and subsurface formations. In embodiments, the hydraulic fracturing composition may also include an aqueous phase, i.e. may include water. The aqueous phase may include at least one of fresh water, salt water, brine, municipal water, formation water, produced water, well water, filtered water, distilled water, sea water, or combinations of these. The brine may include at least one of natural and synthetic brine, such as saturated brine or formate brine. The aqueous phase may use water containing organic compounds or salt. In embodiments, the hydraulic fracturing composition may contain from 10 weight percent (wt. %) to 70 wt. % of the aqueous phase based on the total weight of the hydraulic fracturing composition. In some embodiments, the hydraulic fracturing composition may contain from 28 pounds per barrel (lb/bbl) to 630 lb/bbl, such as from 30 to 600 lb/bbl, from 50 to 500 lb/bbl, from 100 to 500 lb/bbl, 200 to 500 lb/bbl, or 300 to 600 lb/bbl of the aqueous phase.

In embodiments, the hydraulic fracturing composition may be non-aqueous. The hydraulic fracturing composition may include an oleaginous phase, i.e. may include an oil. In embodiments, the hydraulic fracturing composition may contain from 10 wt. % to 90 wt. % of the oleaginous phase based on the total weight of the hydraulic fracturing composition. The hydraulic fracturing composition may contain from 28 lb/bbl to 810 lb/bbl of the oleaginous phase based on the total weight of the hydraulic fracturing composition, such as from 30 to 800 lb/bbl, from 50 to 800 lb/bbl, from 75 to 800 lb/bbl, or from 100 to 800 lb/bbl. In embodiments, the hydraulic fracturing composition may contain from 200 to 800 lb/bbl, or 300 to 600 lb/bbl, or 500 to 810 lb/bbl of the oleaginous phase.

In embodiments, the hydraulic fracturing composition may further include surfactant. The surfactant may be any of the surfactants previously discussed for the surface wettability agent, the interfacial reducing agent, or both. In embodiments, the hydraulic fracturing composition may include chemical additives other than or in addition to the surfactant. The chemical additives may be any chemical additives previously discussed. As non-limiting examples, suitable chemical additives for the hydraulic fracturing composition may also include weighting agents, fluid loss control agents, lost circulation control agents, filtration control additives, antifoaming agents, emulsifiers, weighting agent, fluid loss additives, an alkali reserve, specialty additives, or combinations thereof.

Embodiments herein also include methods of treating a subsurface formation using the coated proppant. The embodiments include hydraulic fracturing compositions and coated proppants, which may be any of the hydraulic fracturing compositions or coated proppants previously discussed. The method may include introducing a first hydraulic fracturing composition into a wellbore. The wellbore may be fluidly connected to the subsurface formation by a plurality of zones spaced along the subsurface formation, such as along the wellbore wall. Particularly, without being limited by theory, the wellbore may be a fluid conduit for the hydraulic fracturing composition from the surface to the subsurface formation. The wellbore may further include internal fluid conduits such as casing, production strings, liners, or combinations thereof. In embodiments, the casing, production strings, and liners may be metal pipe that further serves as an internal conduit from the subsurface formation to the surface. The zones may form a fluid connection between the wellbore and the subsurface formation through one or more perforations, as may be understood in the art.

The method may also include introducing the first hydraulic fracturing composition into the subsurface formation through a first zone of the plurality of zones of the subsurface formation. The method may then include propagating at least one subsurface fracture in the first zone with the first hydraulic fracturing composition.

The method may also include introducing at least one additional hydraulic fracturing composition into at least one additional zone of the plurality of zones of the subsurface formation. The method may then include propagating at least one additional subsurface fracture in at least one additional zone of the plurality of zones of the subsurface formation. As previously discussed, the at least one additional hydraulic fracturing composition may be any of the hydraulic fracturing composition previously discussed supra, and in turn may include any of the coated proppants described supra. However, without being limited by theory, there may be slight differences between the first hydraulic fracturing composition and the at least one additional hydraulic fracturing composition.

In embodiments, and as previously discussed, the additional hydraulic fracturing compositions may be similar to the other hydraulic fracturing compositions. However, the chemical tracers included in each of the additional hydraulic fracturing compositions, and thereby the additional coated proppants, must be different both from each other and the first chemical tracer. In embodiments, this may be due to the need to have chemical tracers that are uniquely identifiable by chemical tracing at surface. This may allow the chemical tracers to be used to identify which zones of the subsurface formation are producing subsurface formation fluids and how much subsurface formation fluids are being produced from each zone. Other benefits of the chemical tracers being uniquely identifiable are also discussed herein.

While the chemical tracers being unique to each other has been previously discussed, it is contemplated that there may be situations in which some of the chemical tracers are the same as other chemical tracers. In one non-limiting example, it may be desired to analyze a subsurface formation in larger sections encompassing multiple zones. Accordingly, this arrangement may not require that all of the chemical tracers be different from each other, rather only chemical tracers in the larger sections must be different from each other. This may allow for analyzing of an entire subsurface formation, including sections that are known to be susceptible to different geological features, such as natural faulting or fracturing. In another example, this may include the general wellbore-subsurface formation areas of the toe, heel and interconnecting section, such as in an unconventional horizontal wellbore.

As previously mentioned, the method may include introducing at least one additional hydraulic fracturing composition into at least one additional zone. As understood in the art, hydraulic fracturing operations may consist of a large number of individual zones to be hydraulically fractures, such as from 1 to 20, from 20 to 50, from 50 to 100, or even 100 to 200. Accordingly, without being limited by any particular theory, the "at least one additional hydraulic fracturing composition", as well as the "at least one supplemental hydraulic fracturing composition" mentioned infra should be understood to contemplate the introduction of at least as many additional hydraulic fracturing compositions into as many additional zones as there are possibilities for unique chemical tracer combinations from the list of chemical tracers described supra, as well any unique subspecies therefrom.

Accordingly, the method may include introducing a second hydraulic fracturing composition, a third hydraulic fracturing composition, a fourth hydraulic fracturing composition, and so on into respective second, third, and fourth zones, each with respective second, third, fourth and so on chemical tracers unique to the other chemical tracers. Similarly, each of these chemical tracers may be analyzed in the produced subsurface formation, thereby correlating their presence to a volumetric amount of produced subsurface formation fluids from the corresponding zone.

In embodiments, the method may further include allowing the second polymeric layers of the first coated proppant and the at least one additional coated proppant to contact subsurface formation fluids in the first zone and the at least one additional zone of the subsurface formation, respectively, thereby releasing the first chemical tracer and the at least one additional chemical tracer, as well as producing at least a portion of the subsurface formation fluids from the subsurface formation.

As previously discussed, the coated proppants herein may be formulated to degrade or be soluble in hydrocarbons or aqueous fluids. Also as previously discussed, the coated proppants herein may be formulated to release or expel the chemical tracers, chemical additives, or both when exposed to hydrocarbons or aqueous fluids. Therefore, the coated proppant may be formulated to have the same properties in the subsurface formation fluids, which may include aqueous fluids, hydrocarbons, or both. The aqueous fluids may include at least one of fresh water, salt water, brine, municipal water, formation water, produced water, well water, filtered water, distilled water, sea water, or combinations of these. The brine may include at least one of natural and synthetic brine, such as saturated brine or formate brine.

The method may also include determining a concentration of the first chemical tracer and a concentration of the at least one additional chemical tracer within the produced subsurface formation fluids utilizing chemical tracing techniques; correlating the concentration of the first chemical tracer to a first volume of the subsurface formation fluids produced from the first zone; and correlating the concentration of the at least one additional chemical tracer to a second volume of the subsurface formation fluids produced from the at least one additional zone. The chemical tracing techniques may include mass-spectrometry, gas chromatography-mass spectrometry, liquid chromatography-mass spectrometry, fluorescence spectroscopy, or combinations thereof, and may generally be dependent on the specific chemical tracer species chosen.

The method may also include allowing the first polymeric layers of the first coated proppant and the at least one additional coated proppant to contact subsurface formation fluids in the first zone and the at least one additional zone of the subsurface formation, respectively, thereby releasing the first chemical additive and the at least one additional chemical additive. The method may then further include allowing the first chemical additive, the at least one additional chemical additive, or both to interact with the subsurface formation fluids, the subsurface formation, or both, thereby affecting the properties of the subsurface formation fluids, the subsurface formation, or both. The observed effect on the subsurface formation fluids or the subsurface formation may generally depend on the chemical additive species chosen.

As previously discussed, the release of the chemical additives may also be delayed by the inclusion of a crosslinker. For example, and in embodiments, release of the first chemical additive may be delayed by the inclusion of the crosslinker, and may be further delayed depending on the amount of crosslinker used.

Embodiments herein may also include methods of utilizing shut-in operations in conjunction with the coated proppants. For example, and in embodiments, the method may include producing at least a portion of the subsurface formation fluids from the subsurface formation before observing a reduction in the production of the subsurface formation fluids from the subsurface formation. The method may then include pausing the production of the subsurface formation fluids for a period of time, commonly referred to as a 'shut-in', and then resuming the production of the subsurface formation fluids after the first chemical additive, the at least one additional chemical additive, or both interact with the subsurface formation fluids, the subsurface formation, or both. Without being limited by theory, the delay in time between producing may allow the released chemical additives to gradually build up within the subsurface formation, thereby affecting the subsurface formation, the subsurface formation fluids, or both, and thereby increase the rate of subsurface formation fluid production when production is resumed.

Without being limited by theory, the chemical additives may also interact with the wellbore or internal fluid conduits therein when the subsurface formation fluids are produced to the surface. In one non-limiting example, chemical additives such as the scale inhibitor may interact with build-ups of paraffin scale on production strings, thereby dissolving the paraffin scale.

Moreover, the effects of the shut-in operations may be measured by utilizing the chemical tracer in the overlying second polymeric layer to correlate the improved production to specific zones. For example, the method may further include determining a concentration of the first chemical tracer and a concentration of the at least one additional chemical tracer within the recovered subsurface formation fluids utilizing chemical tracing techniques; correlating the concentration of the first chemical tracer to a third volume of the subsurface formation fluids recovered from the first zone; correlating the concentration of the at least one additional chemical tracer to a fourth volume of the subsurface formation fluids recovered from the at least one additional zone; comparing the third volume to the first volume to determine the effect of the first chemical additive; and comparing the fourth volume to the second volume to determine the effect of the at least one additional chemical additive. Without being limited by theory, this may allow a comparison of the chemical additive effects in one zone versus another zone, depending on the presence of the associated chemical tracers. It may also allow comparison of separate chemical additives in different zones, useful when determining a chemical additive strategy for a geologic formation as a whole.

Similarly, this may also be accomplished by adding another chemical additive to the first polymeric layer of the coated proppants herein that may be either unique or identical to the first chemical additive or the at least one additional chemical additive. For example, and in embodiments, the method may further include allowing the second polymeric layers of the first coated proppant and the at least one additional coated proppant to contact subsurface formation fluids in the first zone and the at least one additional zone of the subsurface formation, respectively, thereby releasing the another chemical additive; and allowing the another chemical additive to interact with the subsurface formation fluids, the subsurface formation, or both, thereby affecting the properties of the subsurface formation fluids, the subsurface formation, or both. The method may then include producing the subsurface formation fluids from the zones of the subsurface formation.

Embodiments of the methods discussed herein may also be used to detect a variety of downhole events, such as for example water influx, as previously described. Particularly, the fluid medium for the first hydraulic fracturing composition and the at least one additional hydraulic fracturing composition may include an aqueous phase. Further, the first polymeric layer of the first coated proppant may include a second chemical tracer that is unique to the first chemical tracer and the least one additional chemical tracer. The first polymeric layer of the at least one additional coated proppant may in turn include at least one supplemental chemical tracer that is unique to the first, the second, and the at least one additional chemical tracer. The second polymeric layers of both the first coated proppant and the at least one additional coated proppant may then be configured to release their chemical tracers when exposed to an oleaginous phase, i.e. hydrocarbons from the subsurface formation fluids. The first polymeric layers may, in contrast, be configured to release their chemical tracers when exposed to an aqueous phase, i.e. aqueous fluids of the subsurface formation.

Accordingly, an increase in the amount of the second and the at least one supplemental chemical tracer in the produced subsurface formation fluids in chemical tracing analysis at the surface may be correlated to an increase in water production (i.e. water influx) at the zone the specific chemical tracer was injected into. However, water influx may also be observed independently, and then back-correlated to zonal source. Particularly, the method may include observing an increase in a ratio of the aqueous fluids to the hydrocarbons in the produced subsurface formation fluids (i.e. a surface indication independent of chemical tracers.) The method may then include determining a concentration of the second chemical tracer and a concentration of the at least one supplemental chemical tracer within the produced subsurface formation fluids utilizing chemical tracing techniques. The method may then include correlating the concentration of the second chemical tracer to a first volume of the aqueous fluid produced from the first zone; and correlating the concentration of the at least one additional chemical tracer to a second volume of the aqueous fluid produced from the at least one additional zone, thereby determining a zone of water influx among the plurality of zones.

While methods and processes have been described as how to identify downhole events, subsurface formation fluid production, or both by the presence of the chemical tracers, information may also be determined by the lack of the presence of chemical tracers. For example, and in embodiments, the lack of certain chemical tracers being observed at the surface may indicate that those zones of the subsurface formation that they were injected into may not be producing, i.e. the hydraulic fracturing treatments in those zones may have been ineffective. This may include one or more of the means of ineffectiveness or downhole problems previously mentioned herein.

EXAMPLES

The following examples illustrate features of the present embodiments but are not intended to limit the scope of the same.

Example 1

Figure 2:
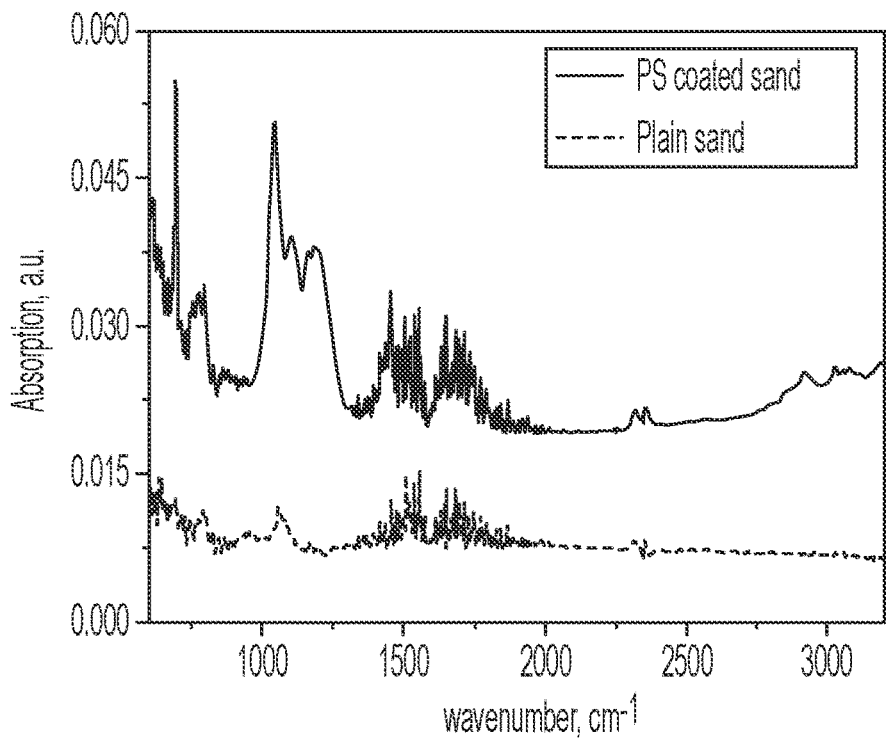
FIG. 2 illustrates a comparison of the infrared radiation absorption of an uncoated proppant versus a coated proppant including barcoded degradable polymers according to embodiments herein.

A coated proppant with the barcoded degradable polymer as the chemical tracer, according to embodiments herein, was formed using the method discussed herein. 100 grams of quartz sand (from Acro organics) as the particulate substrate were first mixed with 0.25 grams of ammonium persulfate (($NH_4)_2S_2O_8$, from VWR) as the radical initiator in 50 mL of water. The mixture was then heated to 70° C. 5 grams of styrene (from Acros organics) as the barcoded degradable polymer monomer and 0.5 grams of divinylbenzene (from Alfa Aesar) as crosslinker were then injected while mechanical stirring continued. The mixture was then continually heated at 70° C. until the mixture was observed to dry into a caked sand. The caked sand was then crushed into coated proppant sand grains. Uncoated sand and the coated proppant were then both subjected to Fourier-transform infrared spectroscopy (FTIS), as shown in FIG. 2. Spectra were recorded by a Nicolet 1S50R FT-IR with a Smart iTR™ Attenuated Total Reflectance (ATR) Sampling Accessory.

As illustrated in FIG. 2, the coated proppant with the polystyrene showed an increased infrared radiation absorption across the entire measured wavelength. In particular, the coated proppant showed a general peak of infrared radiation absorption between the wavelengths of 750 $cm^{-1}$ and 1250 $cm^{-1}$. It is contemplated that a similar response would have been observed with a different molecular coating (such as methylacrylate) but the general peak locations of the FTIS would change per the molecules used. It is further contemplated that analyzing returning subsurface formation fluids in the peaks could show whether subsurface formation fluids are being produced from the zones of the subsurface formation the coated proppants were injected into. It is also contemplated that it could further show how much subsurface formation fluids are being produced from those zones as compared to other zones of the subsurface formation. That is, the subsurface formation fluids should show an increased infrared radiation absorption in this range, in the form of a peak, if fluid is being produced from zones with injected barcoded degradable polymers.

Example 2

Figure 3:
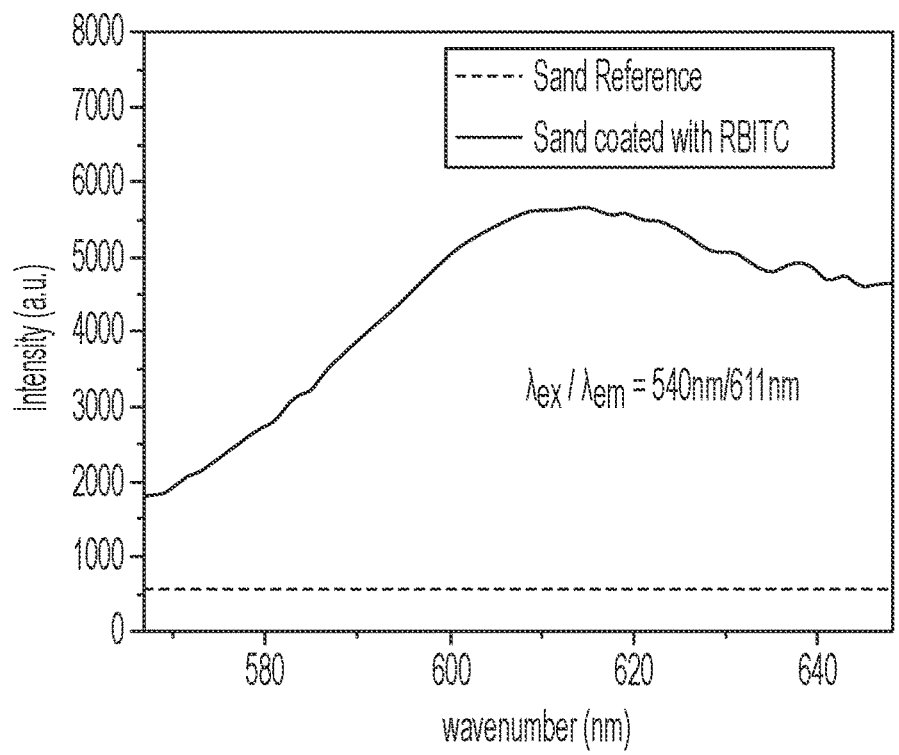
FIG. 3 illustrates a comparison of the fluorescence spectra intensity of an uncoated proppant versus a coated proppant including fluorescent dyes according to embodiments herein.

A coated proppant with fluorescent dye as the chemical tracer, according to embodiments herein, was formed according to the method discussed herein. 100 grams of quartz sand as the particulate substrate were first mixed with 0.25 grams of ammonium persulfate in 50 mL of water. A mixture of 5 grams polyethyleneimine (MW 25000, from Alfa Aesar) and 0.25 grams of divinylbenzene as crosslinker were then injected while mechanical stirring continued. The mixture was then continually heated at 80° C. for one hour. RBITC was then added to the mixture for formation of the coated proppant. At this time the coated proppant was observed to turn a shade of pink, indicating the dye was incorporated within the proppant coating. Uncoated sand and the coated proppant were then both subjected to characterization by fluorescence spectroscopy, as shown in FIG. 3. Spectra were recorded in BioTek Synergy H1 microplate reader at 540 nm excitation.

As illustrated in FIG. 3, the coated proppant with the RBITC exhibited increased fluorescence over the entire wavelength range as compared to the uncoated sand. It is contemplated that a similar response would have been observed with a different fluorescent dye, although not necessarily within the same wavelength range. It is further contemplated that analyzing returning subsurface formation fluids in this fluorescence range could show whether subsurface formation fluids are being produced from the zones of the subsurface formation the coated proppants were injected into. It is also contemplated that it could also show how much subsurface formation fluids are being produced from those zones as compared to other zones of the subsurface formation. That is, the subsurface formation fluids should show an increased fluorescence in this range if fluid is being produced from injected fluorescent dye zones.

Example 3

Figure 4:
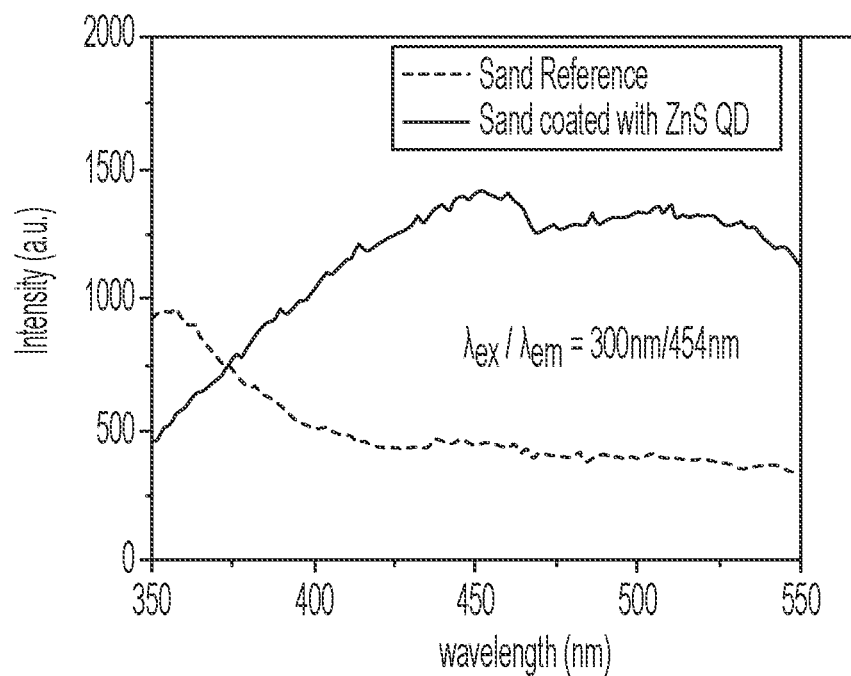
FIG. 4 illustrates a comparison of the fluorescence spectra intensity of an uncoated proppant versus a coated proppant including quantum dot nanoparticles according to embodiments herein.

A coated proppant with quantum dot nanoparticles as the chemical tracer, according to embodiments herein, was formed according to the method discussed herein. 100 grams of quartz sand as the particulate substrate were first mixed with 0.25 grams of ammonium persulfate in 50 mL of 10 wt. % polyacrylic acid (MW250,000 from Aldridh). The mixture was then continually heated at 80° C. for one hour. The mixture was then allowed to cool to room temperature (20° C.) before 10 mL of 10 wt. % zinc chloride solution was added under mechanical mixing conditions. 2 mL of 50 wt. % ammonium sulfide was then added in droplets. The resulting product had zinc sulfide quantum dot coated on the sand as a coated proppant. Uncoated sand and the coated proppant were then both subjected to mass-spectra fluorescence spectroscopy, as shown in FIG. 4. Spectra were recorded in BioTek Synergy H1 microplate reader at 300 nm excitation.

As illustrated in FIG. 4, the coated proppant with the zinc sulfide quantum dot exhibited increased fluorescence over the wavelength range of approximately 375 nm to approximately 550 nm. It is contemplated that a similar response would have been observed with a different quantum dot nanoparticle, although not necessarily in the same wavelength range. It is further contemplated that analyzing returning subsurface formation fluids in this fluorescence range could show whether subsurface formation fluids are being produced from the zones of the subsurface formation the coated proppants were injected into. It is also contemplated that it could also show how much subsurface formation fluids are being produced from those zones as compared to other zones of the subsurface formation. That is, the subsurface formation fluids should show an increased fluorescence in this range if fluid is being produced from injected quantum dot nanoparticles zones.

Example 4

A coated proppant with superparamagnetic nanoparticles as the chemical tracer, according to embodiments herein, was formed according to the method discussed herein. 100 grams of quartz sand as the particulate substrate was first washed with one molar solution of sodium hydroxide. 50 mL of 5 wt. % silane agent (2-(4-chlorosulfonylphenyl)ethyltrimathoxysilane, from Gelest) was then added under mechanical stirring and refluxed for fifteen minutes at approximately 95° C. After allowing the mixture to cool down to room temperature at approximately 23° C., 5 grams of polyethyleneimine was added and stirred for approximately 10 hours. A 10 mL mixture of 0.5 molar $FeCl_2$ and 1 molar $FeCl_3$ was then added, followed by addition of 10 mL of 29.5 wt. % ammonium hydroxide solution. After formation of the $Fe_3O_4$ colloidal particles was observed (by the sand particles changing to dark brown), the coated sand was separated and dried in oven at approximately 60° C. It was observed that the coated proppants were a shade of brown (due to the presence of the iron) after the coating process was complete. It was also observed that the coated proppant had a great attraction to magnetic fields. For example, the coated proppant particles were observed to scale the sides of a test tube they were contained within upon proximity to an external magnet.

Example 5

A long-persistent phosphor nanoparticle, according to embodiments herein, was first formed according to the method discussed herein. $Sr(NO_3)_2$, $AlCl_3$, $EuCl_3$ and $Dy(NO_3)_3$ were first dissolved in deionized water at a stoichiometric ratio. The mixed metal ions were then precipitated as a solid carbonate by adding $(NH_3)_2CO_3$ to the solution. The solid carbonate was then separated and sintered at 1200° C. in a reductive atmosphere with hydrogen gas for six hours to convert the solid carbonate to $SrAl_2O_4$:$Eu^{2+}Dy^{3+}$, which exhibits strong long-persistent (glow-in-the-dark) optical properties. Finally, the calcined solid was ground into a fine powder.

Example 6

Figure 5:
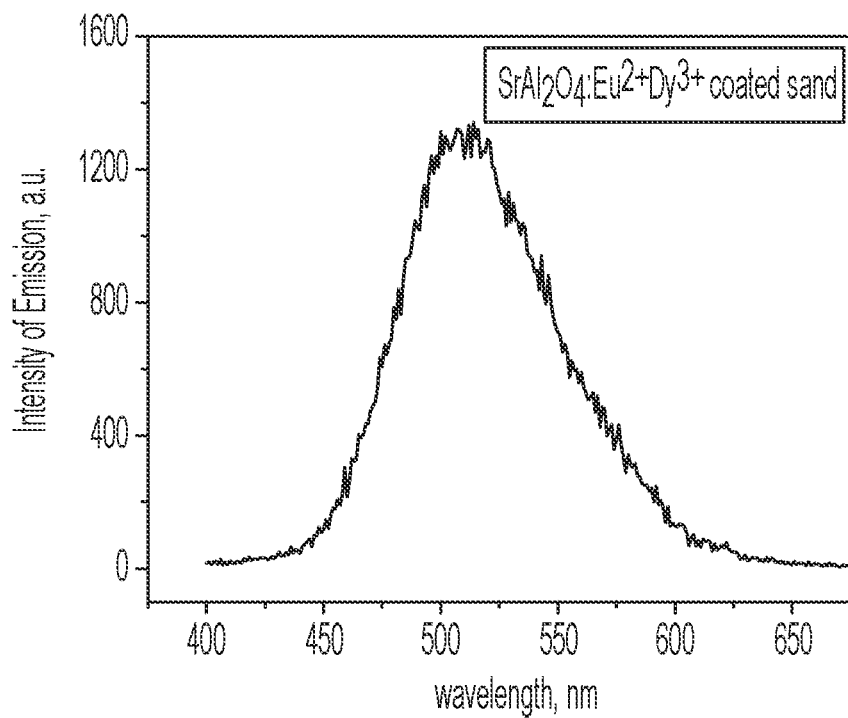
FIG. 5 illustrates a spectra of the time-gated fluorescence spectra intensity of a long persistent phosphor coated proppant, according to embodiments herein.

A coated proppant with the long-persistent phosphor nanoparticles produced in Example 5 as the chemical tracer, according to embodiments herein, was formed according to the method discussed herein. 100 grams of quartz sand, 0.25 grams of ammonium persulfate, 5 grams of polyethyleneimine, 0.25 grams of divinylbenzene as crosslinker, and one gram of the $SrAl_2O_4$:$Eu^{2+}Dy^{3+}$ powder were combined and mixed together in 50 mL of water. The mixture was then heated to 80° C. for one hour, before cooling down to room temperature. The coated sand was then separated and air dried at 60° C. to form the coated proppant. It was observed that the coated proppant exhibited glow-in-the-dark properties after being exposed to visible light. Further, the coated proppant was exposed to time-gated fluorescence spectroscopy, as shown in FIG. 5. The spectrum was recorded by a Horiba NanoLog-3 spectrometer at 350 nm excitation, and the signals were collected at an initial delay of 50 microseconds in a 2 millisecond spectral window. As shown in FIG. 5, the coated proppant experienced significant excitation and fluorescence in the wavelength range of approximately 450 nm to approximately 600 nm. When compared to FIG. 4, the coated proppant experiences significantly increased excitation and fluorescence over an uncoated proppant in the same wavelength range.

It is contemplated that a similar response would have been observed with a different long-persistent phosphor nanoparticle, although not necessarily in the same wavelength range. It is further contemplated that analyzing returning subsurface formation fluids in this fluorescence range could show whether subsurface formation fluids are being produced from the zones of the subsurface formation the coated proppants were injected into. It is also contemplated that it could also show how much subsurface formation fluids are being produced from those zones as compared to other zones of the subsurface formation. That is, the subsurface formation fluids should show an increased fluorescence in this range if fluid is being produced from injected long-persistent phosphor nanoparticles zones.

Having described the subject matter herein in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the embodiments herein, including, but not limited to, embodiments defined in the appended claims. More specifically, although some aspects herein are identified herein as preferred or particularly advantageous, it is contemplated that embodiments herein are not necessarily limited to these aspects.

It is also noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment herein or to emphasize alternative or additional features that may or may not be utilized in a particular embodiment herein.

For the purposes of describing and defining the present invention it is noted that the terms "substantially" and "approximately" are utilized herein to represent the inherent degree of uncertainty that may be attributed to any quantitative comparison, value, measurement, or other representation.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of treating a subsurface formation with a coated proppant, the method comprising:
   introducing a first hydraulic fracturing composition into a wellbore, the wellbore fluidly connected to the subsurface formation by a plurality of zones spaced along the subsurface formation;
   introducing the first hydraulic fracturing composition into the subsurface formation through a first zone of the plurality of zones of the subsurface formation; and
   propagating a subsurface fracture in the first zone with the first hydraulic fracturing composition, and wherein the hydraulic fracturing composition comprises a fluid medium and a first coated proppant dispersed within the fluid medium, the first coated proppant comprising:
   a particulate substrate;
   a first polymeric layer surrounding the particulate substrate, the first polymeric layer comprising a first chemical additive, the chemical additives comprising interfacial tension reducing agents, surface wettability altering agents, fines control agents, biocides, bactericides, corrosion inhibitors, scale inhibitors, hydrogen scavengers, hydrogen sulfide scavengers, foaming agents, de-foaming agents, gases, pH control additives, breakers, gas hydrate inhibitors, oxidizers, reducers, or combinations thereof; and
   a second copolymeric layer surrounding the first polymeric layer, the second copolymeric layer comprising a first chemical tracer, a crosslinker, and one of a polyamine or a polyimine, and wherein:
     the crosslinker is selected from one or more of maleic rosin glycol acrylate, ethylene dimethacrylate, ethylene glycol dimethacrylate (EGDA), or divinylbenzene;
     the first chemical tracer comprises fluorescent dyes, superparamagnetic nanoparticles, or both;
     the fluorescent tracers are selected from one or more of fluorescein isothiocyanates (FITC), Rhodamine B isothiocynates (RBITC), fluorescein succinimidyl esters, or Rhodamine B succinimidyl esters; such that the fluorescent dyes graft to primary and secondary amine groups in the polyamines or polyimines, thereby immobilizing the fluorescent dyes in the second copolymeric layer; and
     the superparamagnetic nanoparticles are selected from one or more of Fe3O4, CoFe2O4, NiFe2O4, or MnFe2O4, such that the superparamagnetic nanoparticles graft to primary and secondary amine groups in the polyamines or polyimines, thereby immobilizing the superparamagnetic nanoparticles in the second copolymeric layer.

2. The method of claim 1, wherein the coated proppant further comprises:
   an additional polymeric layer surrounding the second copolymeric layer, the additional polymeric layer comprising an additional chemical additive, an additional chemical tracer that is unique to the first chemical tracer, or both, wherein:
   the chemical additive in the additional polymeric layer comprises the interfacial tension reducing agents, the surface wettability altering agents, the fines control agents, the biocides, the bactericides, the corrosion inhibitors, the scale inhibitors, the hydrogen scavengers, the hydrogen sulfide scavengers, the foaming agents, the de-foaming agents, the gases, the pH control additives, the breakers, the gas hydrate inhibitors, the oxidizers, the reducers, or combinations thereof, and
   the additional chemical tracer in the additional polymeric layer comprises barcoded degradable polymers, the fluorescent dyes, quantum dot nanoparticles, the superparamagnetic nanoparticles, up-conversion phosphors, long-persistent phosphors, time-resolved fluorescence resonance energy transfer polymer-nanoparticles (TR-FRET), or combinations thereof;

an intermediate layer positioned between the first polymeric layer and the second copolymeric layer, the intermediate layer comprising the barcoded degradable polymer; or both.

3. The method of claim 1, further comprising:
introducing an additional hydraulic fracturing composition into an additional zone of the plurality of zones of the subsurface formation;
propagating an additional subsurface fracture in the additional zone of the plurality of zones of the subsurface formation, wherein the additional hydraulic fracturing composition comprises the fluid medium and an additional coated proppant dispersed within the fluid medium, the additional coated proppant comprising:
the particulate substrate;
the first polymeric layer surrounding the particulate substrate, the first polymeric layer comprising an additional chemical additive comprising the interfacial tension reducing agents, the surface wettability altering agents, the fines control agents, the biocides, the bactericides, the corrosion inhibitors, the scale inhibitors, the hydrogen scavengers, the hydrogen sulfide scavengers, the foaming agents, the de-foaming agents, the gases, the pH control additives, the breakers, the gas hydrate inhibitors, the oxidizers, the reducers, or combinations thereof; and
the second copolymeric layer surrounding the first polymeric layer, the second copolymeric layer comprising an additional chemical tracer that is unique to the first chemical tracer, the additional chemical tracer comprising barcoded degradable polymers, the fluorescent dyes, quantum dot nanoparticles, the superparamagnetic nanoparticles, up-conversion phosphors, long-persistent phosphors, time-resolved fluorescence resonance energy transfer polymer-nanoparticles (TR-FRET), or combinations thereof.

4. The method of claim 3, further comprising:
allowing the second copolymeric layers of the first coated proppant and the additional coated proppant to contact subsurface formation fluids in the first zone and the additional zone of the subsurface formation, respectively, thereby releasing the first chemical tracer and the additional chemical tracer of the additional coated proppant; and
producing at least a portion of the subsurface formation fluids from the subsurface formation.

5. The method of claim 4, wherein the subsurface formation fluids comprise hydrocarbons, aqueous fluids, or both.

6. The method of claim 4, further comprising:
determining a concentration of the first chemical tracer and a concentration of the additional chemical tracer of the additional coated proppant within the produced subsurface formation fluids;
correlating the concentration of the first chemical tracer to a first volume of the subsurface formation fluids produced from the first zone; and
correlating the concentration of the additional chemical tracer of the additional coated proppant to a second volume of the subsurface formation fluids produced from the additional zone.

7. The method of claim 6, wherein the concentrations of the first chemical tracer and the additional chemical tracer of the additional coated proppant are determined utilizing mass-spectrometry, gas chromatography-mass spectrometry, liquid chromatography-mass spectrometry, fluorescence spectroscopy, or combinations thereof.

8. The method of claim 6, further comprising:
producing at least a portion of the subsurface formation fluids from the subsurface formation;
observing a reduction in the production of the subsurface formation fluids from the subsurface formation;
pausing the production of the subsurface formation fluids for a period of time, thereby allowing:
the first polymeric layers of the first coated proppant and the additional coated proppant to contact subsurface formation fluids in the first zone and the additional zone of the subsurface formation, respectively, thereby releasing the first chemical additive and the additional chemical additive of the additional coated proppant, and
the first chemical additive, the additional chemical additive of the additional coated proppant, or both to interact with the subsurface formation fluids, the subsurface formation, or both;
resuming the production of the subsurface formation fluids;
determining a concentration of the first chemical tracer and a concentration of the additional chemical additive of the additional coated proppant within the recovered subsurface formation fluids;
correlating the concentration of the first chemical tracer to a third volume of the subsurface formation fluids recovered from the first zone;
correlating the concentration of the additional chemical additive of the additional coated proppant to a fourth volume of the subsurface formation fluids recovered from the additional zone;
comparing the third volume to the first volume to determine the effect of the first chemical additive; and
comparing the fourth volume to the second volume to determine the effect of the additional chemical additive of the additional coated proppant.

9. The method of claim 6, wherein:
the subsurface formation fluids comprise hydrocarbons and aqueous fluids;
the fluid medium of the first hydraulic fracturing composition and the additional hydraulic fracturing composition comprise an aqueous phase;
the first polymeric layer of the first coated proppant comprises a second chemical tracer that is unique to the first chemical tracer and the additional chemical tracer;
the first polymeric layer of the additional coated proppant comprises a supplemental chemical tracer that is unique to the first, the second, and the additional chemical tracer;
the second copolymeric layers of the first coated proppant and the additional coated proppant are configured to release the first chemical tracer and the additional chemical tracer, respectively, when exposed to an oleaginous phase;
the first polymeric layers of the first coated proppant and the additional coated proppant are configured to release the second chemical tracer and the supplemental chemical tracer, respectively, when exposed to an aqueous phase; and
the method further comprises:
observing an increase in a ratio of the aqueous fluids to the hydrocarbon in the produced subsurface formation fluids;
determining a concentration of the second chemical tracer and a concentration of the supplemental chemical tracer within the produced subsurface formation fluids;

correlating the concentration of the second chemical tracer to a first volume of the aqueous fluid produced from the first zone; and correlating the concentration of the additional chemical tracer to a second volume of the aqueous fluid produced from the additional zone, thereby determining a zone of water influx among the plurality of zones.

10. The method of claim 3, further comprising:
allowing the first polymeric layers of the first coated proppant and the additional coated proppant to contact subsurface formation fluids in the first zone and the additional zone of the subsurface formation, respectively, thereby releasing the first chemical additive and the additional chemical additive of the additional coated proppant; and allowing the first chemical additive, the chemical additive of the additional coated proppant, or both to interact with the subsurface formation fluids and the subsurface formation, thereby affecting an interfacial tension, a wettability, a fines production, a biologic activity, a bacterial activity, a risk of corrosion, a hydrogen gas content, a hydrogen sulfide content, a foam stability, a gas content, a pH, a viscosity, a gas hydrate content, or combinations thereof of the subsurface formation fluids and the subsurface formation.

11. The method of claim 10, wherein:
the first polymeric layer of the first coated proppant further comprises a crosslinker, the crosslinker delaying release of the first chemical additive;
the first polymeric layer of the additional coated proppant further comprises a crosslinker, the crosslinker delaying release of the additional chemical additive of the additional coated proppant; or
both.

12. The method claim 10, further comprising:
producing at least a portion of the subsurface formation fluids from the subsurface formation;
observing a reduction in the production of the subsurface formation fluids from the subsurface formation;
pausing the production of the subsurface formation fluids for a period of time; and
resuming the production of the subsurface formation fluids after the first chemical additive, the additional chemical additive of the additional coated proppant, or both interact with the subsurface formation fluids, the subsurface formation, or both, thereby increasing the rate of subsurface formation fluid production.

13. The method of claim 3, wherein:
the second copolymeric layers of the first coated proppant, the additional coated proppant, or both further comprise another chemical additive, the another chemical additive comprising the interfacial tension reducing agents, the surface wettability altering agents, the fines control agents, the biocides, the bactericides, the corrosion inhibitors, the scale inhibitors, the hydrogen scavengers, the hydrogen sulfide scavengers, the foaming agents, the de-foaming agents, the gases, the pH control additives, the breakers, the gas hydrate inhibitors, the oxidizers, the reducers, or combinations thereof; and
the method further comprises:
allowing the second copolymeric layers of the first coated proppant and the additional coated proppant to contact subsurface formation fluids in the first zone and the additional zone of the subsurface formation, respectively, thereby releasing the another chemical additive of the first coated proppant, the additional coated proppant, or both; and allowing the another chemical additive of the first coated proppant, the additional coated proppant, or both to interact with the subsurface formation fluids and the subsurface formation, thereby affecting an interfacial tension, a wettability, a fines production, a biologic activity, a bacterial activity, a risk of corrosion, a hydrogen gas content, a hydrogen sulfide content, a foam stability, a gas content, a pH, a viscosity, a gas hydrate content, or combinations thereof of the subsurface formation fluids and the subsurface formation; and producing the subsurface formation fluids from the plurality of zones of the subsurface formation.

14. The method of claim 1, wherein the particulate substrate comprises oxide particles, silicate particles, sands, ceramic particles, resin particles, plastic particles, mineral particles, glass particles, silica particles, alumina particles, fumed carbon particles, carbon black, graphite, mica, titania, zirconia, boron, fly ash, or combinations thereof.

15. The method of claim 1, wherein
the first polymeric layer further comprises a crosslinker; and
the crosslinker comprises maleic rosin glycol acrylate, ethylene dimethacrylate, ethylene glycol dimethacrylate, divinylbenzene, or combinations thereof.

16. The method of claim 1, further comprising:
introducing a second hydraulic fracturing composition into a second zone of the plurality of zones of the subsurface formation;
propagating an additional subsurface fracture in the second zone of the plurality of zones of the subsurface formation, wherein the second hydraulic fracturing composition comprises the fluid medium and a second coated proppant dispersed within the fluid medium, the second coated proppant comprising:
the particulate substrate;
the first polymeric layer surrounding the particulate substrate, the first polymeric layer comprising a second chemical additive, the second chemical additive comprising the interfacial tension reducing agents, the surface wettability altering agents, the fines control agents, the biocides, the bactericides, the corrosion inhibitors, the scale inhibitors, the hydrogen scavengers, the hydrogen sulfide scavengers, the foaming agents, the de-foaming agents, the gases, the pH control additives, the breakers, the gas hydrate inhibitors, the oxidizers, the reducers, or combinations thereof; and
the second copolymeric layer surrounding the first polymeric layer, the second copolymeric layer comprising a second chemical tracer that is unique to the first chemical tracer, the second chemical tracer comprising barcoded degradable polymers, the fluorescent dyes, quantum dot nanoparticles, the superparamagnetic nanoparticles, up-conversion phosphors, long-persistent phosphors, time-resolved fluorescence resonance energy transfer polymer-nanoparticles (TR-FRET), or combinations thereof;
introducing a third hydraulic fracturing composition into a third zone of the plurality of zones of the subsurface formation;
propagating an additional subsurface fracture in the third zone of the plurality of zones of the subsurface formation, wherein the third hydraulic fracturing composition comprises the fluid medium and a third coated proppant dispersed within the fluid medium, the third coated proppant comprising:
the particulate substrate;
the first polymeric layer surrounding the particulate substrate, the first polymeric layer comprising a third chemical additive, the third chemical additive comprising the interfacial tension reducing agents, the surface wettability altering agents, the fines control agents, the biocides, the bactericides, the corrosion inhibitors, the scale inhibitors, the hydrogen scavengers, the hydrogen sulfide scavengers, the foaming agents, the de-foaming agents, the gases, the pH control additives, the breakers, the gas hydrate inhibitors, the oxidizers, the reducers, or combinations thereof; and
the second copolymeric layer surrounding the first polymeric layer, the second copolymeric layer comprising a third chemical tracer that is unique to both the first chemical tracer and the second chemical tracer, the third chemical tracer comprising the barcoded degradable polymers, the fluorescent dyes, the quantum dot nanoparticles, the superparamagnetic nanoparticles, the up-conversion phosphors, the long-persistent phosphors, the time-resolved fluorescence resonance energy transfer polymer-nanoparticles (TR-FRET), or combinations thereof;
introducing an additional hydraulic fracturing composition into an additional zone of the plurality of zones of the subsurface formation;
propagating an additional subsurface fracture in an additional zone of the plurality of zones of the subsurface formation, wherein the additional hydraulic fracturing composition comprises the fluid medium and additional coated proppant dispersed within the fluid medium, the additional coated proppant comprising:
the particulate substrate;
the first polymeric layer surrounding the particulate substrate, the first polymeric layer comprising an additional chemical additive, the additional chemical additive comprising the interfacial tension reducing agents, the surface wettability altering agents, the fines control agents, the biocides, the bactericides, the corrosion inhibitors, the scale inhibitors, the hydrogen scavengers, the hydrogen sulfide scavengers, the foaming agents, the de-foaming agents, the gases, the pH control additives, the breakers, the gas hydrate inhibitors, the oxidizers, the reducers, or combinations thereof; and
the second copolymeric layer surrounding the first polymeric layer, the second copolymeric layer comprising an additional chemical tracer that is unique to the first, second, and third chemical tracers, the additional chemical tracer comprising the barcoded degradable polymers, the fluorescent dyes, the quantum dot nanoparticles, the paramagnetic nanoparticles, the up-conversion phosphors, the long-persistent phosphors, the time-resolved fluorescence resonance energy transfer polymer-nanoparticles (TR-FRET), or combinations thereof.

17. The method of claim 16, further comprising:
allowing the second copolymeric layers of the first, second, third, and the additional coated proppant to contact subsurface formation fluids in the first, second, third, and additional zone, respectively, thereby releasing the first, second, third, and the additional chemical tracer;
producing at least a portion of the subsurface formation fluids from the subsurface formation;
determining a concentration of the first, second, third, and the additional chemical tracer within the produced subsurface formation fluids;
correlating the concentration of the first chemical tracer to a first volume of the subsurface formation fluids produced from the first zone;
correlating the concentration of the second chemical tracer to a second volume of the subsurface formation fluids produced from the second zone;
correlating the concentration of the first chemical tracer to a third volume of the subsurface formation fluids produced from the third zone; and
correlating the concentration of the additional chemical tracer to a fourth volume of the subsurface formation fluids produced from the additional zone.

\* \* \* \* \*